Dec. 5, 1939.   F. SCHENK   2,182,097
PHOTO GUN
Filed March 15, 1938
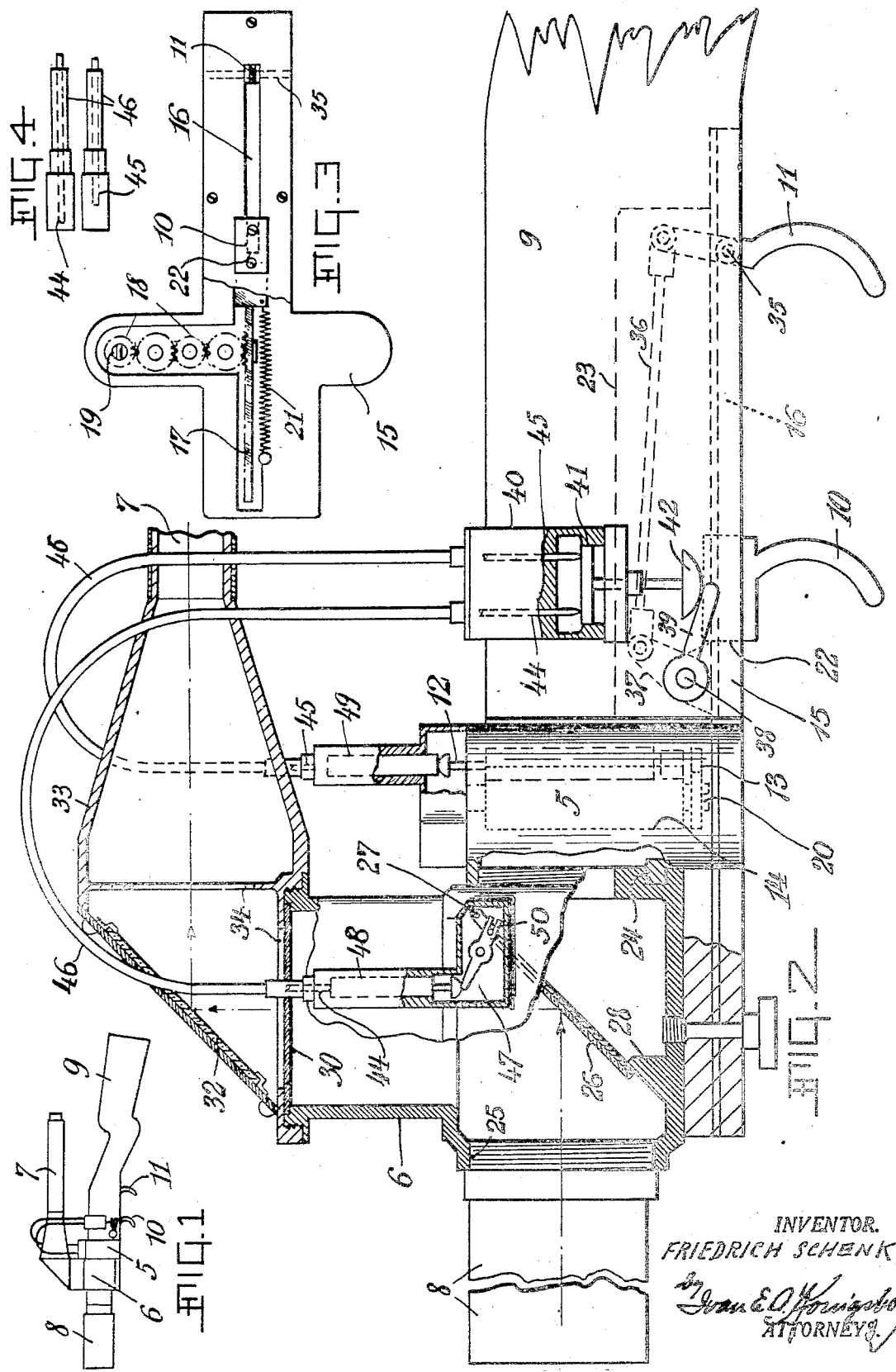
INVENTOR.
FRIEDRICH SCHENK Patented Dec. 5, 1939

2,182,097

UNITED STATES PATENT OFFICE 2,182,097

PHOTO GUN

Friedrich Schenk, Jamaica, N. Y., assignor to E. Leitz, Inc., a corporation of New York Application March 15, 1938, Serial No. 195,977

1 Claim. (Cl. 95—42)

This invention relates to photographic apparatus and has particular reference to an apparatus known as a photo gun, i. e., a camera combined with a telescope and telephoto objective for taking pictures in the open and mounted on a gun stock so that it may be aimed and handled like a gun.

The object of the invention is to provide a photographic apparatus substantially in the form of a gun provided with triggers for operating the shutter release and rewind of a camera together with means for focusing the camera. In the accompanying drawing illustrating the invention Fig. 1 is a miniature outline picture of the entire photo gun.

Fig. 2 is a full size side view of the photo gun with parts in section and parts broken away.

Fig. 3 is a top plan view of a base plate showing the gear mechanism for rewinding the shutter.

Fig. 4 is a detail view.

Referring to Fig. 1 the reference numeral 5 denotes the camera mechanism of a miniature or hand camera of the type which for instance is sold under the trade name Leica. In front of the camera there is mounted a housing 6 containing means for observing the field of view through a telescope 7. The numeral 8 denotes a telephoto objective of any standard or known construction. The parts are mounted on a gun stock 9 wherey the entire apparatus may be aimed and manipulated like a gun, there being two triggers 10 and 11 the operation of which will be explained below. The camera as a whole includes the camera mechanism 5 and the objective 8, these parts being separated by the housing 6. For the sake of convenience the part 5 will hereinafter be referred to as the camera.

The construction and operation of the camera is fully disclosed in the United States Patent No. 2,122,671 dated July 5, 1938. The camera is a roll film camera in which the shutter is opened to make an exposure by operating a shutter release member which projects from the top of the camera. After an exposure the shutter is rewound and the film advanced one picture length by the operation of a rotating shutter rewinding member.

In the present application therefore only the shutter release and rewinding members are shown and referred to because these two instrumentalities are the only parts of the known camera mechanism which are actuated when the triggers are operated. In the drawing the shutter release member is shown dotted at 12 and the rotating shutter rewinding and film advancing member is shown at 14. The numeral 13 indicates the well known gearing whereby the shutter is rewound and the film advanced. When the member 12 is depressed, an exposure is made. When the member 14 is rotated, the shutter is rewound and the film advanced. The complete detailed operation of these parts are shown in the said Patent 2,122,671 and are well known in the art.

The camera 5 is suitably mounted upon a base 15. The latter has a slot 16, Fig. 3, in which the trigger 10 is adapted to move, being pulled rearward by the operator like a trigger on a gun. The trigger is connected to a rack 17 which is in operative engagement or mesh with a train of gears 18 for rotating a key shaft 19 adapted to engage in a slot 20 in the rewinding member 14, see Fig. 2, to rotate the latter. A spring 21 normally keeps the trigger 10 up against the forward end 22 of the slot 16. The base 16 is countersunk in the gun stock 9 which is suitably recessed as at 23 to accommodate operating parts.

Forward of the camera 5 the housing 6 is mounted, the same having a threaded flange 24 whereby it may be attached to the camera in place of the usual objective and before the parts are secured to the base and the gun stock. Forwardly the housing carries a telephoto objective 8, the latter being screwed into the housing as at 25. Within the housing there is pivoted a mirror 26 upon a shaft 27. The mirror rests upon a stop 28 either by gravity or there may be a spring not shown coiled about the shaft 27 to normally urge the mirror into its lower position as shown.

The image in the field of view in the objective is reflected backwards into the mirror 26 and from thence reflected upwards upon a ground glass plate 30 in the housing. The image is then seen in another fixed mirror 32 which reflects it backwards into the telescope 7. With the parts in the position in Fig. 2 the operator aims the gun at the object and reaches forward with his left hand to rotate and focus the objective until he sees the image of the object clearly in the mirror 32. There is a connection 33 between the telescope and the housing, it being understood that the parts just described are mounted light-tight and that there are suitable openings 34 for the passage of the light rays from the object.

When the photographer has aimed the gun and focused the objective, he makes an exposure by lifting the mirror 26 so as to shut off the upwardly reflected light rays and open the way into the camera directly from the objective. This requires two operations namely lifting the mirror and depressing the camera shutter release. To accomplish these operations the operator pulls the other trigger 11. The latter is pivoted at 35 within the recess 23 in the stock 9 and is connected by a link 36 to an arm 37 upon a shaft 38. The latter extends outside of the stock 9 and carries a finger 39. Upon the side of the gun stock 9 there is mounted a housing 40 which contains a plunger 41 operated by a button 42 in contact with the finger 39. Push cables 44 and 45 pass into the housing 40. One push cable 44 is connected to depress a plunger 48 on the housing 6. This plunger operates a lever 47 which by a forked connection at 50 rotates the shaft 27 to lift the mirror 26. The other push cable 45 is connected to depress a plunger 49 which in turn depresses the shutter release 12.

It is obvious that the mirror 26 must be lifted before an exposure can be made. Consequently the cable 44 is longer than the cable 45 so that when the cables are pushed the shaft 27 is actuated before the shutter release, see Fig. 4, which shows the operating ends of the two cables which are enclosed in sheaths 46 as usual.

The operation is as follows. When the photographer wants to take a picture, he lifts the gun to his shoulder like any other gun and aims it at the object by looking through the telescope 7. He holds the gun with both hands but uses his left hand to focus the objective. Thereafter he pulls the trigger 11 whereby he lifts the button 42 and pushes the two cables to lift the mirror 26 in advance of releasing the shutter. Immediately thereafter he may pull the trigger 10 whereby to operate the train of gears 18 to rewind the shutter for the next exposure. As soon as an exposure has been made, the mirror 26 is automatically lowered to exclude light from the camera while the shutter is rewound and the film advanced for the next picture. The action is extremely rapid so that the operator by quickly and alternately pulling the two triggers and following the object by looking through the telescope is able to take one snap shot after the other, the operation being entirely automatic upon the pulling of the triggers.

I claim:

A photo gun comprising a camera mechanism having a depressible shutter release projecting upwardly therefrom and a shutter rewinding member operable through the bottom of said mechanism, an objective, a housing between the latter and said camera mechanism for connecting the same to form a camera, a pivoted mirror in said housing having a normal lowered position for excluding incoming light rays through said objective from reaching said camera mechanism and for reflecting the image of the object upwardly through said housing, a push cable operatively connected to said mirror to raise the same when an exposure is to be made, a second push cable operatively connected to the said shutter release to depress the same to make an exposure, a plunger adapted to actuate said push cables to raise said mirror and operate said shutter release, said push cables being of different lengths for raising said mirror before the shutter is released, means for supporting the said push cables and plunger, a base for supporting said camera and housing a gun stock secured to the base behind the camera, a trigger in said base, means in said base and within the gun stock for operatively connecting said trigger and plunger to actuate the latter when said trigger is pulled, a second trigger in said base, a train of gears in the base operatively connected to said rotatable shutter rewinding member, mechanism operatively connected to said second trigger and gears to actuate the latter when said second trigger is pulled and a telescope connected to said housing for viewing the reflected image of the object and aiming the photo gun.

FRIEDRICH SCHENK.